United States Patent [19]

Terawaki

[11] Patent Number: 5,668,628
[45] Date of Patent: Sep. 16, 1997

[54] DETECTION ANGLE CONTROL METHOD FOR LASER SENSOR

[75] Inventor: Fumikazu Terawaki, Yamanashi, Japan

[73] Assignee: Fanuc Ltd., Yamanashi, Japan

[21] Appl. No.: 502,358

[22] Filed: Jul. 14, 1995

[30] Foreign Application Priority Data

Jul. 13, 1994 [JP] Japan ................... 6-183056

[51] Int. Cl.$^6$ ................... G01B 11/26; B25J 9/00
[52] U.S. Cl. ................... 356/139.03; 901/3; 901/9; 901/47
[58] Field of Search ................... 356/139.03; 901/3, 901/9, 47

[56] References Cited

U.S. PATENT DOCUMENTS

| | | | |
|---|---|---|---|
| 4,590,577 | 5/1986 | Nio et al. | 364/513 |
| 4,753,569 | 6/1988 | Pryor | 414/730 |
| 4,808,064 | 2/1989 | Bartholet | 901/47 X |
| 5,053,976 | 10/1991 | Nose et al. | 364/513 |
| 5,280,179 | 1/1994 | Pryor et al. | 364/513 X |
| 5,302,833 | 4/1994 | Hamar et al. | 250/561 |
| 5,321,353 | 6/1994 | Furness | 318/568.11 |
| 5,374,830 | 12/1994 | Pryor | 250/561 |
| 5,488,470 | 1/1996 | Ooenoki | 356/138 |

*Primary Examiner*—Mark Hellner
*Attorney, Agent, or Firm*—Staas & Halsey

[57] ABSTRACT

A robot is moved to a laser sensor detection angle adjustment position, and scanning with a laser beam is started. As this is done, a reading-scanning operation of a CCD light detector of a laser sensor is executed repeatedly, and cell numbers i for maximum detection outputs and their output values $\beta i$ are stored. When the laser beam scanning is finished, the individual output values $\beta i$ are compared with a reference value $\alpha$. If all the values $\beta i$ are not greater than the reference value $\alpha$, then the robot attitude is changed by a small angle, and repetition of laser beam scanning, reading-scanning of the CCD detector, storing of cell numbers i for the great detection output and their output values $\beta i$ and comparison between the values $\beta i$ and the reference value $\alpha$ are repeated. An attitude $\phi$ for the point of time when the reference value $\alpha$ is exceeded by all the values $\beta i$ is taught to the robot, and a welding operation is performed by moving the robot along a step corner line of a workpiece in a manner such that an instruction path is corrected in accordance with a conventional real-time tracking system based on the laser sensor without changing the robot attitude $\phi$.

3 Claims, 6 Drawing Sheets

DETECTION ANGLE CONTROL METHOD FOR LASER SENSOR

BACKGROUND OF THE INVENTION

1. Field of the Invention

The present invention relates to a detection angle control method for laser sensors which are attached to industrial robots adapted for use in plants, production lines, etc. and are used to control paths of transfer of the robots.

2. Description of the Related Art

Conventionally known is a technique such that a robot is furnished with a laser sensor for sensing a region near the position of the robot on the advanced side thereof, the laser sensor is used to detect predetermined regions (ridge lines, weld lines, etc.) of an object of operation (hereinafter referred to as workpiece), and an instruction path for the robot is corrected in accordance with the result of detection of the laser sensor, whereby a robot path corresponding to a line of operation is obtained. For example, the position of the operation line is detected on each occasion by means of the laser sensor during operational program playback operation of the robot, and the instruction path is corrected on a real time basis according to the result of the detection as the robot is moved along a weld line. This system, called a real-time tracking system, is used for a robot for arc welding and the like.

Thus, according to an instruction path correction method using the laser sensor, the robot path can be settled corresponding to the position of each workpiece even in case the workpiece is not positioned accurately. Naturally, however, this can be attained only on the assumption that the workpiece position is normally detected by means of the laser sensor.

As mentioned later, the laser sensor deflectively scans the workpiece surface by projecting a laser beam thereon, and a reflection of the projected laser beam is detected by means of a light detector. Depending on the light reflecting properties (especially angular measure) of the workpiece surface, therefore, a satisfactory reflected light intensity cannot be obtained unless the attitude of the laser sensor for the detection of the workpiece position is selected properly.

In teaching a position to the robot furnished with the laser sensor by using a teaching playback system, a robot position (including an attitude) which is expected to provide an optimum laser sensor attitude for a standard workpiece position is taught under normal conditions.

In many cases, however, the positioning states of workpieces, as objects of operation, are subject to substantial variations during robot playback operation. It is difficult for the aforesaid teaching system, therefore, to keep the positions and attitudes of the individual workpieces and the laser sensor in good relations at all times. Even if there is an attitude which ensures maintenance of good relations with all the workpieces, moreover, detecting this attitude requires complicated adjusting operations, thus presenting a serious inconvenience.

OBJECT AND SUMMARY OF THE INVENTION

The object of the present invention is to provide a method for adjusting the detection angle of a laser sensor attached to an industrial robot in a manner such that the laser sensor assumes a satisfactory attitude for detection corresponding to the positioning state of a workpiece to be worked by the robot.

According to the present invention, the detection angle of a laser sensor is adjusted for each individual workpiece, in principle, before a main operation of a robot (e.g., welding operation along a weld line).

First, a robot moves to a previously taught position for laser sensor detection angle adjustment, and adjustment of the laser sensor detection angle is executed. In the adjustment of the laser sensor detection angle, an appropriate attitude of the robot is obtained in a manner such that the light detection level of light detecting means of the laser sensor is checked as the robot attitude is changed.

In the case where the laser sensor uses a CCD of one-dimensional array type, the robot is brought to a stationary attitude in the laser sensor detection angle adjustment position, a laser sensor detection angle adjustment command is delivered from a robot control device to a control section of the laser sensor, and the workpiece is scanned at least once with a laser beam. As this is done, reading-scanning operation of the CCD is executed many times, and light detection output data for individual cells thus read are stored. Based on these data, the propriety of the light detection level for the robot attitude is determined.

The propriety of the light detection level is determined by comparing maximum detection values $\beta i$ (i=1, 2, 3, ... N) for all the cells (first to N'th cells) that correspond to a laser beam scanning range, obtained by one cycle of laser beam scanning, with a reference value $\alpha$. If all the output values $\beta 1, \beta 2, \beta 3, ... \beta N$ are greater than the value $\alpha(\beta i > \alpha)$, the detection angle of the laser sensor is concluded to be appropriate, and the robot attitude for that time is taught to the robot.

If $\beta i > \alpha$ does not hold for any cell (i'th cell), on the other hand, it is concluded that the detection angle of the laser sensor is inappropriate and should be adjusted, the robot attitude (i.e., detection angle of the laser sensor) for that time is changed, and the determination of the propriety of the light detection level is repeated.

In this manner, the laser sensor detection angle which will satisfy a determination criterion is sought, and its corresponding robot attitude is taught to the robot. Maintaining this taught attitude, the robot executes its main or original operation (e.g., arc welding operation along a weld line) for the workpiece concerned.

In principle, the above-described processes are repeatedly executed for each workpiece as an object of operation. Thus, an appropriate laser sensor detection angle can be set for each workpiece without requiring any high positioning accuracy, so that the reliability of various robot operations using the laser sensor can be improved. Also, the load of operation for teaching the robot attitude for the appropriate laser sensor detection angle can be lightened considerably.

BRIEF DESCRIPTION OF THE DRAWINGS

The foregoing and other objects and feature of the invention will become apparent from the following description of preferred embodiments of the invention with respect to the accompanying drawings, in which.

DETAILED DESCRIPTION OF THE PREFERRED EMBODIMENTS

Figure 1:
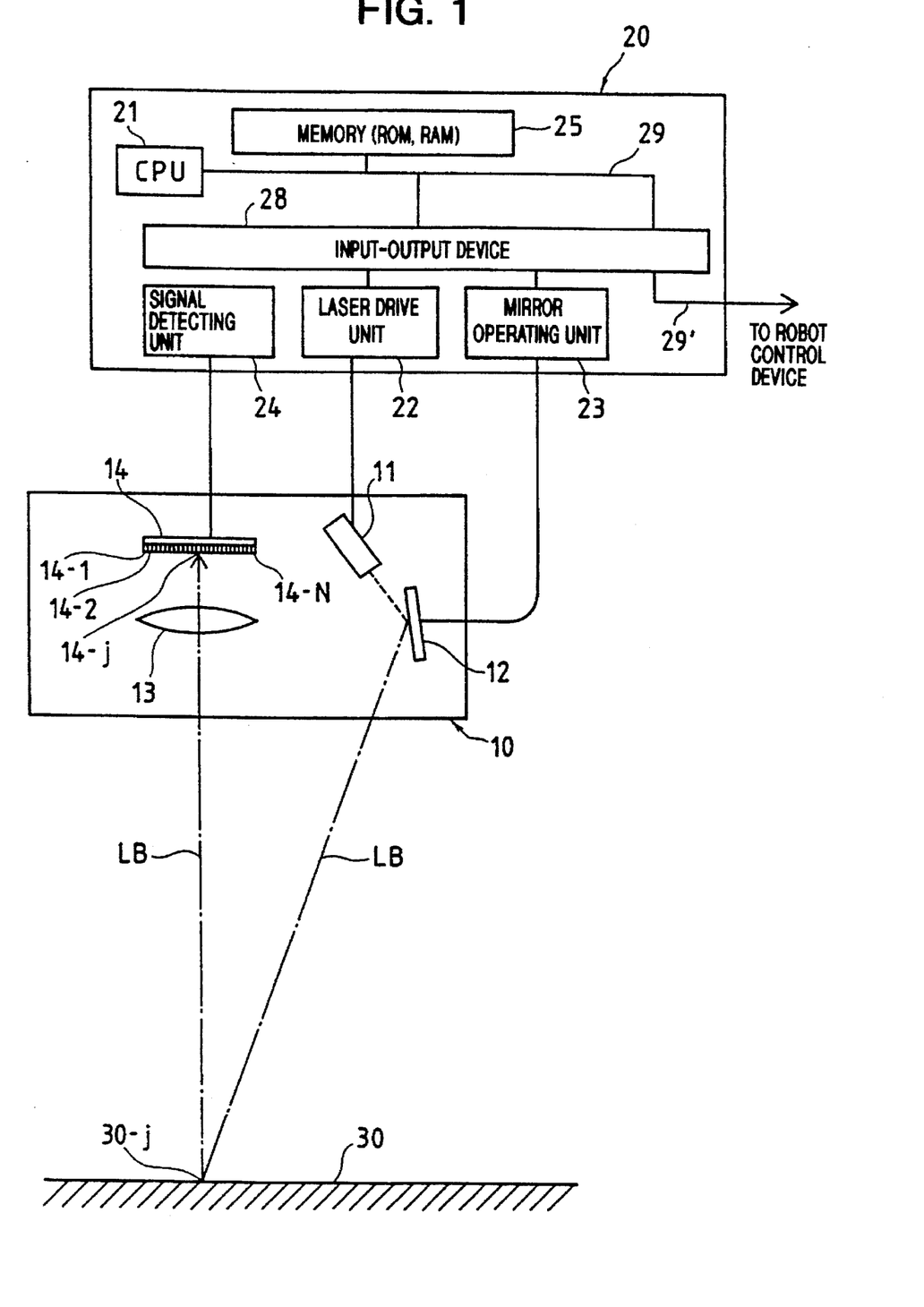
FIG. 1 is a diagram showing an example of a laser sensor used in carrying out a method according to the present invention.

FIG. 1 shows an outline of an arrangement of a laser sensor. As is generally known, the laser sensor forms a line of light spots on a surface to be detected by deflective scanning with a laser beam, and projects a light spot image on light detecting means, thereby obtaining a three-dimensional position information associated with the light spots.

In FIG. 1, numeral 10 denotes a detecting section, which includes a laser oscillator 11, a rocking mirror (galvanometer) 12 for scanning with a laser beam LB, and an optical system 13 for catching reflected light and forming an image on a light sensing element 14. A control section 20, which constitutes a sensor board, includes a CPU 21 formed of a microprocessor. The CPU 21 is connected with an input-output device 28 and a memory 25, which includes a ROM and a RAM, by means of a bus 29.

The input-output device 28 is connected with a laser drive unit 22 for driving the laser oscillator 11 to generate the laser beam LB, a mirror operating unit 23 for rocking the rocking mirror 12, and a signal detecting unit 24 for detecting a position from the position of light reception on the light sensing element 14. Also, the input-output device 28 is connected to a line 29' for transferring various commands and data to and from a robot control device (not shown). In some cases, the line 29' may be a data bus.

When a laser sensor activating command is received from the robot control device, a laser sensor drive program stored in the memory 25 is activated, whereupon the CPU 21 delivers a laser drive command to the laser drive unit 22 to actuate the laser oscillator 11, thereby generating the laser beam LB. Also, the CPU 21 delivers a mirror scanning command to the mirror operating unit 23 to rock the rocking mirror 12, so that the laser beam LB generated from the laser oscillator 11 is applied to an object 30 to scan the same.

The laser beam LB, diffusedly reflected by the object 30, is transmitted through the optical system 13 to form an image on the light sensing element 14, depending on the position of reflection on the object. The light sensing element may be formed of a CCD (charge-coupled device) of a split type or a PSD (position sensitive detector) of a non-split integration type.

In this case, the light sensing element 14 is supposed to be formed of a one-dimensional CCD array which includes N (e.g. N=512) number of cells 14-1 to 14-N. A light beam incident upon one cell 14-j (or some adjacent cells) of the light sensing element 14 is converted into a photoelectron, and is stored in the cell(s). Electric charges stored in the individual cells are delivered in succession from the end cell 14-1 at every predetermined period, in accordance with a CCD scanning signal from the signal detecting unit 24, and are transferred through the signal detecting unit 24 and the input-output device 28 to be subjected to processing such as A/D conversion. Thereupon, up-to-date data are stored in the memory 25.

The scanning period of the CCD 14 is set so as to be shorter enough than that of the rocking mirror 12, and the respective transitions of the rocking angle of the mirror 12 and the output state of the CCD 14 can be grasped as required. The output state of the CCD 14 in each CCD scanning cycle is first seized according to the light detection output for each of the cells 14-1 to 14-N, and the cell position (which may be given by a point halfway between two cell positions in some cases) for a maximum light detection output is detected in accordance with the output state. Based on this cell position, the position (designated by 30-j in FIG. 1) of the object 30 with respect to the sensor is calculated.

Figure 2:
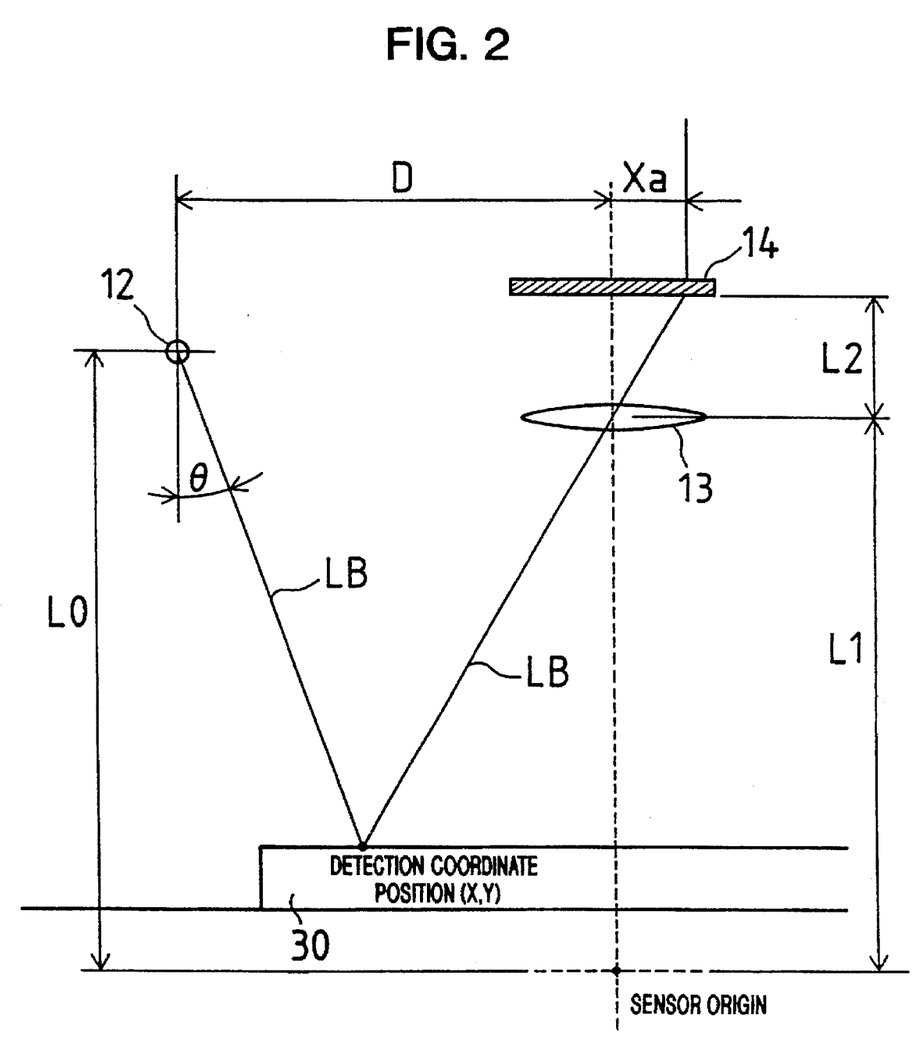
FIG. 2 is a diagram for illustrating the way the position of a light spot on an object can be obtained by means of the laser sensor shown in FIG. 1.

FIG. 2 is a diagram for illustrating the way the coordinate position (X, Y) of the light spot of the laser beam LB projected on the object 30 can be obtained from a position Xa detected by means of the light sensing element 14. In FIG. 2, the Y-axis is given by a straight line (broken line in FIG. 2) which connects the respective centers of the optical system (lens 13) and the element 14, while the X-axis is an axis which intersects the Y-axis at right angles thereto in a position (sensor origin) on the Y-axis. Thus, the sensor origin corresponds to the origin (0,0) of an XY coordinate system.

Referring to FIG. 2, it is supposed that the distance from the sensor origin to the center of the optical system (lens 13) is L1, the distance from the center of the optical system to the center of the light sensing element 14 is L2, the distance from the sensor origin to the pivotal center of the rocking mirror 12 in the X-axis direction is D, and the Y-axis distance from the sensor center to the pivotal center of the mirror 12 is L0. The respective values of these distances are fixed values.

When an angle $\theta$ of a reflection of the laser beam LB from the rocking mirror 12 to the Y-axis direction and the position Xa of light reception on the light sensing element 14 are detected individually, the position of the light spot of the laser beam LB on the subject surface, that is, the detection coordinate position (X, Y), can be obtained according to the following equations (2) and (3).

$$X = Xa \cdot \{(L1-L0)\cdot\tan\theta + D\}/(Xa + L2\cdot\tan\theta), \quad (2)$$

$$Y = \{L1\cdot Xa + L2\cdot(L0\cdot\tan\theta - D)\}/(Xa + L2\cdot\tan\theta). \quad (3)$$

The CPU 21 of the control section 20 activates a position calculation program stored in the memory 25 in accordance with a position detection command from the robot control device, and executes processes corresponding to the calculations of equations (2) and (3). The results of calculation are transferred to the robot control device. The data transferred to the robot control device, along with position/attitude data for a robot, are utilized for the calculation of a three-dimensional position corresponding to the position of reflection.

Besides the conventional position detecting operation described above, according to this embodiment for carrying out the present invention, some of the processes (which will be described in detail later) for adjusting the detection angle of the laser sensor and teaching the adjusted angle to the robot are executed in response to a laser sensor detection angle adjustment command from the robot control device.

Figure 3:
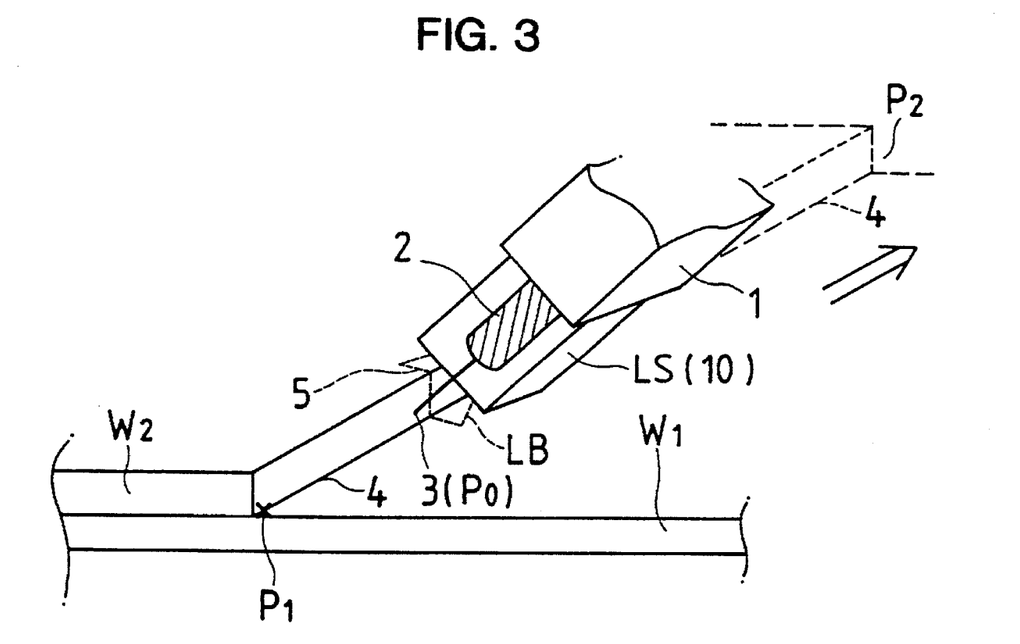
FIG. 3 is a schematic view for illustrating an example of an arrangement for the case where the invention is applied to a welding operation for a portion having a difference in level by means of a welding robot.

FIG. 3 is a schematic view for illustrating an example of an arrangement for the case where the present invention is applied to a welding operation for a portion having a difference in level by means of a welding robot which is furnished with the laser sensor described above. Only a distal end portion of the robot is shown in FIG. 3. In FIG. 3, symbols W1 and W2 designate workpieces as objects of welding, and numeral 4 denotes a step corner line along which copy welding is carried out. The welding uses a welding torch 2 which is attached to a distal end portion 1 of the arm of the robot by means of a suitable attachment mechanism. Numeral 3 denotes the tool center point of the robot. The robot arm end portion 1 is fitted with a laser sensor LS (incorporating the detecting section 10 of FIG. 1) as well as the welding torch 2. The laser sensor LS deflectively scans the corner line 4 with the laser beam LB on either side of the line 4. Numeral 5 denotes a light spot trace generated by the laser beam LB.

The welding operation is performed covering the overall length of a portion having a difference in level (hereinafter referred to as step portion) in a manner such that the welding torch 2, with current supplied, is moved in the direction of the arrow along the corner line 4, from a corner starting end (point P1) to a corner terminal end (point P2). According to the present embodiment, the process for adjusting the detection angle of the laser sensor in a position P0 is executed for each workpiece (or for each workpiece representative of a series of workpieces which are assured of a predetermined positioning accuracy before starting the welding operation). This position P0, that is, the laser sensor detection angle adjustment position P0, should be taught beforehand in accordance with a supposed standard positioning state of the workpiece.

Figure 4:
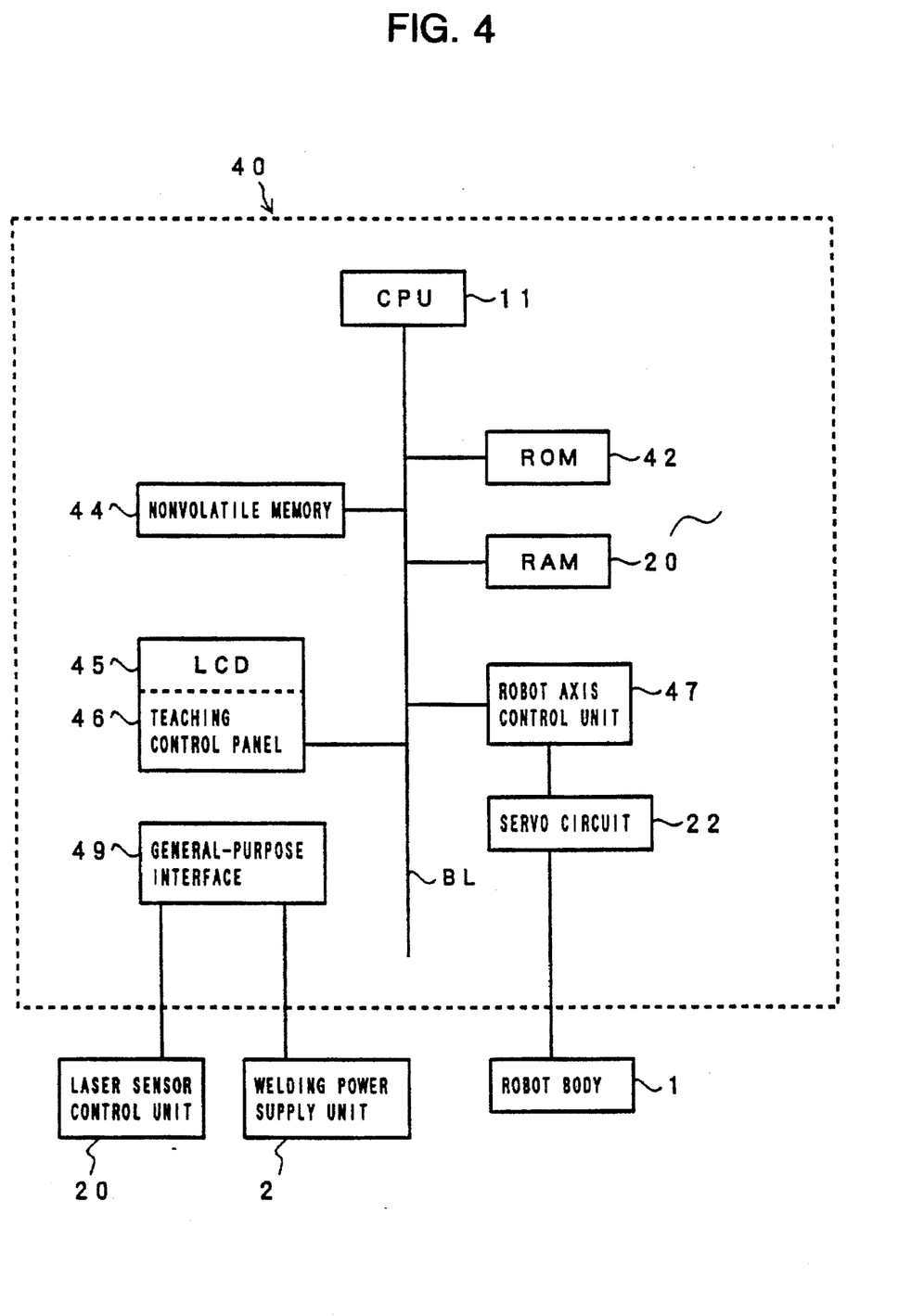
FIG. 4 is a block diagram of a robot control device used in carrying out the invention.

FIG. 4 is a block diagram showing an arrangement of the principal part of a general system including the robot control device, which is used in carrying out the step portion welding.

Referring to FIG. 4, the robot control device 40 includes a central processing unit (hereinafter referred to as CPU) 41. The CPU 41 is connected with a ROM 42, RAM 43, nonvolatile memory 44, teaching control panel 46 with a liquid crystal display 45, robot axis control unit 47 connected to a welding robot body 1 through a servo circuit 48, and a general-purpose interface 4 connected to the control section 20 (see FIG. 1) for the laser sensor LS and a welding power supply unit 2', by means of a bus line BL.

The ROM 42 is loaded with various programs whereby the CPU 41 controls the robot body 1, laser sensor control section 20, welding power supply unit 2', and robot control device 40 itself. The RAM 43 is a memory which is utilized for temporary storage of data and computation. The nonvolatile memory 44 is supplied and loaded with various parameter set values and an operational program for the robot.

Here it is supposed that the laser sensor detection angle adjustment position P0 and points P1 (corner starting end) and P2 (corner terminal end) are taught as an instruction path designated by the operational program in a playback system such that "straight line" is given as a movement form. The robot attitude taught at each of the points P0 to P2 is supposed to correspond to the median of an allowable range for the execution of welding.

If the shapes, sizes, and positioning states of the workpieces W1 and W2 are coincident with those of a workpiece used for instruction in the playback system, the instruction path is in line with the corner line 4. If not (or if positioning is inaccurate), however, a substantial deviation may be caused between the instruction path and the corner line 4 of each workpiece.

According to the present embodiment, the present invention is characterized in that the laser sensor detection angle adjustment position P0 is set in the vicinity of the point P1 or the welding operation starting position, and the angle adjustment for the laser sensor is executed before the welding operation, an original robot operation, is started. Accordingly, the following preparations are made besides the teaching for the points P0 to P2.

Figure 5:
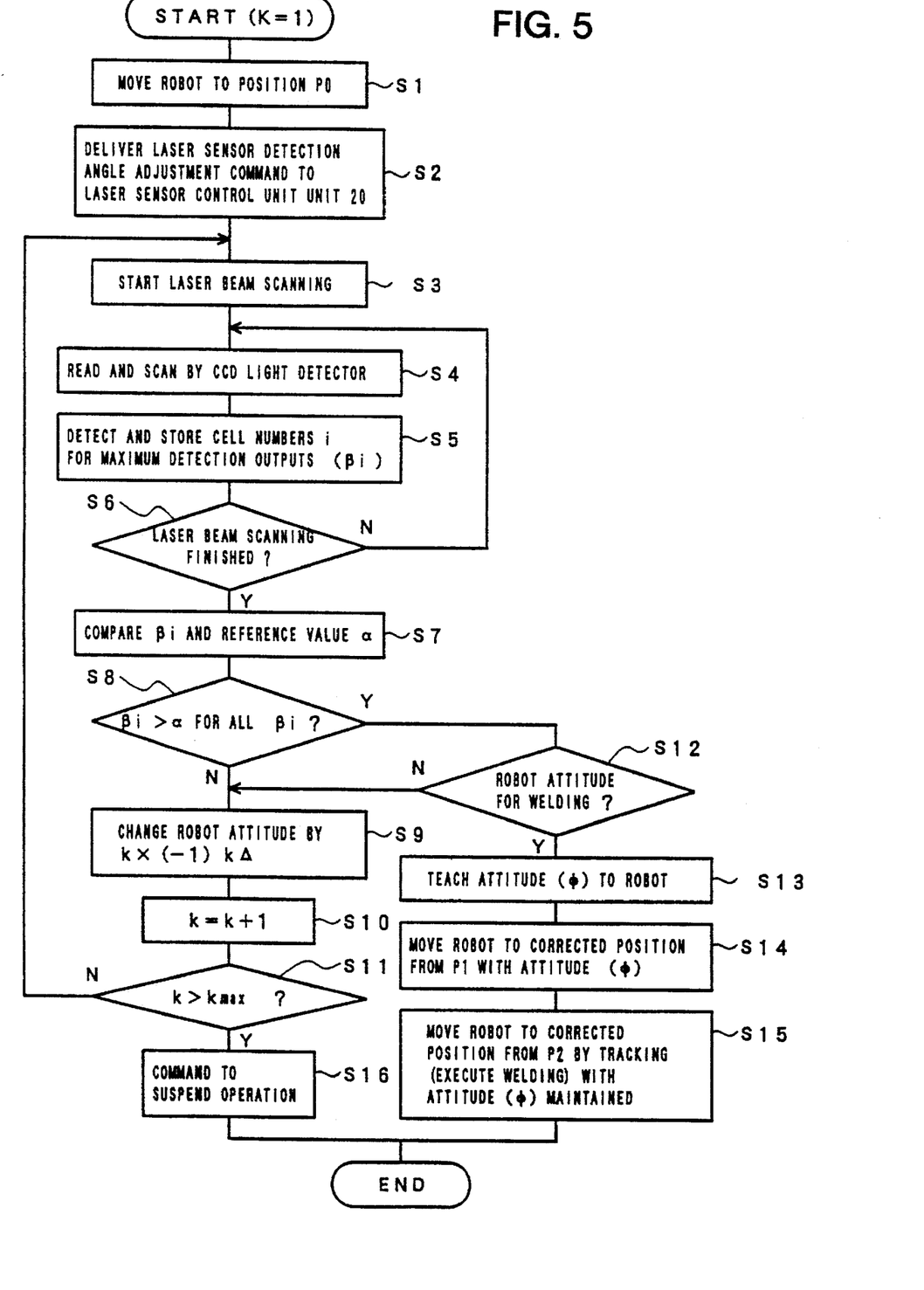
FIG. 5 is a flowchart showing steps of procedure of detection angle adjustment for the laser sensor executed by means of the robot control device of FIG. 4 and a laser sensor control section shown in FIG. 1.

(1) The memory 25 of the laser sensor control section 20 is previously loaded with programs, which are activated in response to the laser sensor detection angle adjustment command from the robot control device and are used to execute some of the processes for adjusting the detection angle of the laser sensor and teaching the adjusted angle to the robot, and relevant set values (which will be described in detail later with reference to the flowchart of FIG. 5 and the graph of FIG. 6), besides the programs whereby processing for the conventional position detecting operation is executed in response to a position detecting operation command from the robot control device.

(2) The nonvolatile memory 44 of the robot control device 40 is previously loaded with a program, whereby the robot attitude is changed in accordance with a laser sensor output (propriety of the laser sensor attitude) obtained during the laser sensor detection angle adjustment and the laser sensor control section 20 determines again the propriety of the robot attitude, a determination reference value (value $\alpha$ mentioned later), and other relevant set values (robot attitude variation degree $\Delta$, data indicative of an allowable robot attitude range for welding operation, etc.).

Processes executed by the robot control device 40 and the laser sensor control section 20 in the aforementioned prior conditions and arrangements will now be described with reference to the flowchart of FIG. 5 and the diagrams of FIGS. 6 to 8.

A robot attitude adjustment process is started with the initial value of an index k at 1 (k=1). First, one block of the operational program is read by means of the robot control device 40, and the robot is moved to the laser sensor detection angle adjustment position P0 (Step S1). Then, the laser sensor detection angle adjustment command is delivered from the robot control device 40 to the laser sensor control section 20 (Step S2). On receiving this command, the control section 20 starts laser beam scanning, and immediately executes a first cycle of reading-scanning operation of the CCD light detector (Step S3).

The light detection output of each cell, obtained by the reading-scanning operation, is subjected to processes such as A/D conversion in the signal detecting unit 24 (see FIG. 1), and is temporarily stored in a memory region of an address number assigned to each cell. Further, the detection output is analyzed in accordance with an analysis program by the CPU 41, and cell numbers i for the maximum detection outputs and values $\beta i$ of the maximum detection outputs are stored (Step S5).

The reading period of the CCD light detector is set to be much shorter than the laser beam scanning period, so that the reading operation of the CCD light detector is executed many times before each cycle of laser beam scanning is finished. Thus, the aforementioned processes of Steps S4 and S5 are repeated many times in one cycle of laser beam scanning (N in Step S6). As a result, every cycle of laser beam scanning produces data for a large number of spots between a detection starting point (corresponding to cell number 0) and a detection end point (corresponding to cell number N) on the surface to be detected, that is, combinations of data on the number i of the cell which produced the maximum detection output for the individual spots and the values $\beta i$ of those maximum detection outputs. In the case where those maximum detection output values $\beta i$ is produced from the cell of number i and further considerable amount of laser beam is incident upon adjacent cells (e.g., those of numbers i−1 and i+1), the sum total of the detection output value $\beta i$ for the cell of the number i and those of the adjacent cells may be regarded as the maximum value $\beta i$ for the cell of number i.

When the completion of one cycle of laser beam scanning is detected (Y in Step S6), each of the maximum detection output values $\beta i$ (i=1, 2, 3, ... N) obtained as a result of the scanning is compared with the reference value $\alpha$ (Step S7), and whether or not $\beta i > \alpha$ holds for all the values $\beta i$ is determined (Step S8).

Figure 6:
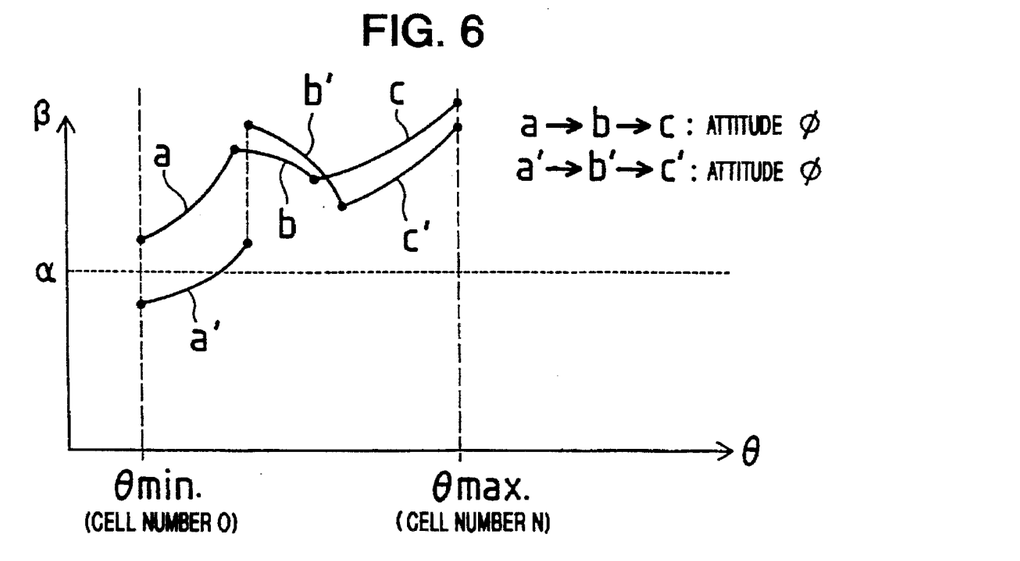
FIG. 6 is a diagram showing models of the light detection level for individual cells of a light sensing element for the case where the detection angle of the laser sensor of FIG. 1 is appropriate and the case where the detection angle is inappropriate.
Figure 7:
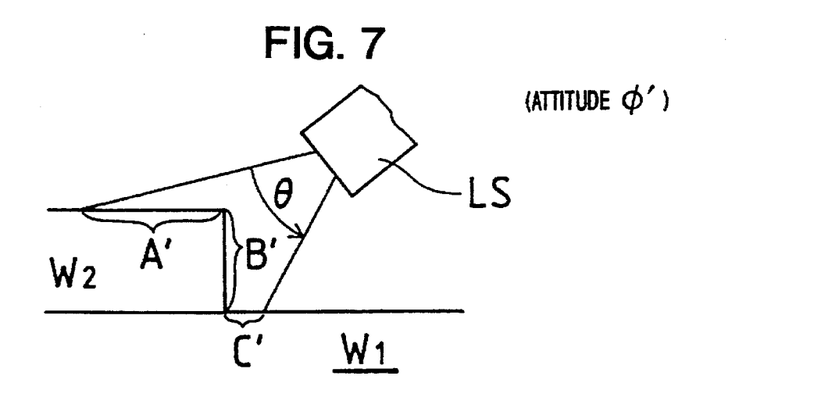
FIGS. 7 and 8 are diagrams for illustrating a state in which the detection angle of the laser sensor for a workpiece (surface to be detected) is appropriate and a state in which the detection angle is inappropriate, respectively.
Figure 8:
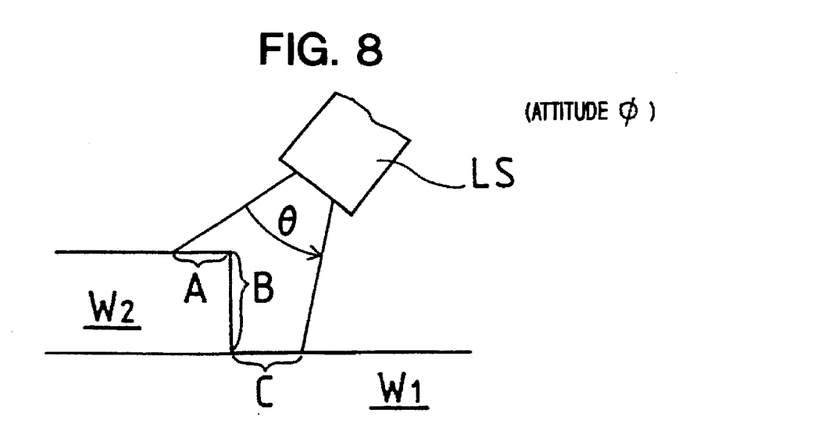

Referring now to FIGS. 6 to 8, the robot attitude and transitions of the maximum detection output value $\beta i$ detected depending on the attitude will be described.

FIG. 7 shows the way the upper surface (face A') and end face (face B') of the workpiece W2 and the upper surface (face C') of the workpiece W1 are scanned with the laser beam in the order named by means of the laser sensor attached to the robot in an attitude $\phi'$. On the other hand, FIG. 8 shows the way the upper surface (face A) and end face (face B) of the workpiece W2 and the upper surface (face C) of the workpiece W1 are scanned with the laser beam in the order named by means of the laser sensor attached to the robot in an attitude $\phi$.

FIG. 6 is a diagram showing transitions of the maximum detection output values $\beta i$ for the laser beam scanning angle $\theta$ in a range from a minimum angle $\theta min$ to a maximum angle $\theta max$ (i.e., for a cell number of the light sensing element ranging from 0 to N). In FIG. 6, curves a, b and c represent maximum detection output values for the faces A, B and C for the case of FIG. 8 in which the laser sensor attitude is $\phi$. Likewise, curves a', b' and c' represent maximum detection output values for the faces A', B' and C' for the case of FIG. 7 in which the laser sensor attitude is $\phi'$.

In the laser beam scanning by means of the laser sensor in the attitude shown in FIG. 7, the laser beam is projected at a pretty narrow angle to the face A' of the workpiece W2 at the start of the scanning operation and for some time thereafter, and a reflected from a light spot on the face A' of the workpiece W2 is directed to the laser sensor LS at a considerably narrow angle to the face A'. As a result, a slight component of the reflected light from the light spot on the face A' returns to the laser beam side for some time immediately after the laser beam scanning is started from the face A' of the workpiece W2. As indicated by curve a' in FIG. 6, therefore, the volume (maximum detection output value $\beta i$) of light received by the cell of the number corresponding to the face A')is smaller than the reference value $\alpha$. The volumes b' and c' of light received by the cells of the numbers corresponding to the faces B' and C' are larger than the reference value $\alpha$, though.

In the case where the laser beam scanning is started with the robot attitude $\phi'$ (Step S3), $\beta i > \alpha$ does not hold for some values of $\beta i$ as a result of the comparison in Step S7, so that the decision in Step S8 is No. In the case where the laser beam scanning is started with the robot attitude $\phi$, on the other hand, $\beta i > \alpha$ holds for all values of $\beta i$ as a result of the comparison in Step S7, so that the decision in Step S8 is Yes.

If the decision in Step S8 becomes No, it is concluded that the robot attitude (i.e., sensor detection angle) $\phi'$ is inappropriate, whereupon the program advances to a process for changing the robot attitude.

The following is a description of an example of a robot attitude changing rule. First, an initial attitude (attitude taught by the adjustment position P0) is shifted by a margin $\Delta$ in the negative direction (Step S9), and the value k is incremented by 1 to become 2 (Step S10). If a predetermined maximum value kmax is not then reached by the value k (=2) (Step S11), the program returns to Step S3. Thereupon, the laser beam scanning is restarted with the changed robot attitude, and thereafter, the processes of Steps S4 to S8 are executed. If the decision in the second process of Step S8 is still No, the robot attitude is shifted by a margin $2\Delta$ in the positive direction this time. Thereafter, the program returns to Step S3 via Steps S10 and S11, and the Steps S4 to S8 are then repeated.

The laser beam scanning is repeated after modifying the robot attitude alternately in the positive and negative directions so that its variation gradually increases by degrees of $-\Delta, +2\Delta, -3\Delta ... k \times (-1) \Delta^k$ at a time. When the decision in Step S8 becomes Yes in the long run, any of the maximum detection output values $\beta i$ (i=0 to N) detected in the cycle of laser beam scanning concerned is greater than the reference value $\alpha$.

FIG. 8 shows an arrangement for laser beam scanning which is carried out with the robot attitude $\phi$ when the decision in Step S8 is Yes. In FIG. 8, the maximum detection output values $\beta i$ for the corresponding cells i obtained by scanning the faces A, B and C correspond to curves a, b and c of FIG. 6. FIG. 8, unlike FIG. 7, indicates that the laser beam is projected at a relatively wide angle on any of the faces A, B and C, and that reflected light directed from each of light spots on the faces A, B and C to the laser sensor can never be inclined at a particularly small angle to each subject surface.

If the decision obtained in Step S8 is Yes, it is confirmed that the robot attitude $\phi$ constitutes no hindrance to the robot operation (Step S12). In case of any hindrance, the program returns to Step S9, whereupon the robot attitude is further changed.

If both the decisions in Steps S8 and S12 are not Yes even after the change of the robot attitude in Step S9 is repeated a predetermined number of times (kmax), something unusual, such as a dislocation of a workpiece beyond its limits, is supposed to have occurred. Thereupon, a command is given to suspend the welding operation for the workpiece at once (Step S16), thereby temporarily terminating the process, the cause of the trouble is cleared up, and a process for removing the unusual situation is executed.

If the decision Yes is obtained in Step S8 with the initial attitude of the robot maintained or with the attitude changed (kmax−1) number of times or less in Step S9, and if the attitude $\phi$ is a reasonable value for welding, the attitude $\phi$ is stored as an instruction robot attitude in the nonvolatile memory 44 of the robot control device 40.

Then, an ordinary position detection command is delivered from the robot control device 40 to the control section 20 of the laser sensor, and the robot kept in the attitude $\phi$ is moved toward a position which is obtained by correcting the position P1 in accordance with the result of detection by the laser sensor (Step S14). At a suitable point of time before or after this operation, the welding torch 2 is ignited, and the welding operation is performed in a manner such that the robot is moved to a position which is obtained by correcting the position P2 in accordance with the result of detection by the laser sensor, using a conventional real-time tracking system based on the laser sensor (Step S15), whereupon one processing cycle terminates.

The above is a description of the case where the welding robot is furnished with the laser sensor which includes the CCD element. It is to be understood, however, that the detection angle of the laser sensor can be set properly by applying the same concept as aforesaid to the case where the light detector of the laser sensor is formed of a PSD or CCD camera. It is evident, moreover, that the application of the present invention is not limited to arc welding of step portions, and that the feature of the invention can be utilized for various other applications by setting the criteria for the propriety of the robot attitude in conformity with the details of operation.

What is claimed is:

1. A detection angle control method for a laser sensor, comprising the steps of:

(a) moving a robot furnished with a laser sensor to a laser sensor detection angle adjustment position;

(b) emitting a laser beam from said laser sensor to an object of operation at a laser detection angle to scan said object with said laser beam;

(c) adjusting an attitude of said robot to allow a satisfactory light detection level of said laser beam reflected by said object and detected by the laser sensor at the laser sensor detection angle adjustment position;

(d) teaching the attitude to the robot; and (e) executing a robot operation for the object of operation while maintaining the robot at said taught attitude.

2. A detection angle control method for a laser sensor according to claim 1, wherein said robot attitude adjustment step (c) includes the steps of:

(c1) determining, in accordance with a predetermined criterion, whether the light detection level is satisfactory when the laser sensor scans said object with said laser beam and with the robot at one attitude;

(c2) changing the one attitude to a second attitude when said step (c1) determines that said light detection level is not satisfactory;

(c3) determining again, in accordance with the predetermined criterion, whether the light detection level is satisfactory when the laser sensor scans said object with the laser beam and with the robot at the second attitude changed in said step (c2); and (c4) teaching the second attitude to the robot when said step (c3) determines that said light detection level is satisfactory.

3. A detection angle control method for a laser sensor, comprising the steps of:

(a) positioning a robot at a laser sensor detection angle adjustment position and at an attitude predetermined for an object of operation;

(b) activating a laser sensor attached to the robot to scan a section between one point on the object of operation and another point with a laser beam;

(c) receiving a reflection of a light spot on the object of operation, produced by the scanning with the laser beam, by a detecting section of the laser sensor;

(d) comparing a detection level of a light sensing element in the detecting section with a predetermined reference level;

(e) determining whether a currently set laser sensor detection angle is satisfactory based on a result of said comparison;

(f) teaching the robot the current laser sensor detection angle as an attitude for an execution of an operation for the object when the current detection angle is determined to be satisfactory in said step (e), on the other hand, when concluded inappropriate, making a predetermined degree of change in the; and (g) when the current detection angle is determined not to be satisfactory, changing said current robot attitude by a predetermined degree and then repeating said step (b) to step (e) until said step (e) determines that said current detection angle is satisfactory, and thereafter, teaching the robot the changed laser sensor detection angle as an attitude for the execution of operation for the object.

* * * * *